United States Patent [19]

Mizokawa

[11] 4,170,715
[45] Oct. 9, 1979

[54] DATA COMMUNICATION SYSTEM

[75] Inventor: Sadao Mizokawa, Hitachi, Japan

[73] Assignee: Hitachi, Ltd., Japan

[21] Appl. No.: 821,340

[22] Filed: Aug. 3, 1977

[30] Foreign Application Priority Data

Aug. 7, 1976 [JP] Japan .................................. 51-94270

[51] Int. Cl.² ........................ H04L 25/49; H04L 3/00
[52] U.S. Cl. .................................... 178/68; 325/38 A
[58] Field of Search .............. 307/234; 178/66 R, 67, 178/68; 325/30, 38 A; 340/347 DD, 347 CC; 328/53; 329/145

[56] References Cited

U.S. PATENT DOCUMENTS

| 3,806,807 | 4/1974 | Nakamura | 178/68 |
| 3,980,825 | 9/1976 | Morrien | 178/67 |
| 3,980,826 | 9/1976 | Widmer | 325/42 |
| 3,993,953 | 11/1976 | Lender et al. | 178/68 |
| 4,041,239 | 8/1977 | Haass | 325/38 A |

Primary Examiner—Benedict V. Safourek
Attorney, Agent, or Firm—Craig and Antonelli

[57] ABSTRACT

At the transmitting side of a data communication system, data to be transferred is converted to digital pulse-coded transmission data including a combination of two pulse signals whose pulse durations are different from each other. The pulse duration of the digital pulse-coded transmission data is detected to change the amplitude level of the digital pulse-coded transmission data so that the frequency-attenuation characteristic of signals in a transmission path may be compensated in accordance with the detected pulse duration. This modulated transmission data is sent through the transmisson path and is demodulated at the receiving end of the transmission path.

5 Claims, 6 Drawing Figures

४,१७०,७१५

DATA COMMUNICATION SYSTEM

LIST OF PRIOR ART REFERENCES (37 CFR 1.56 (a))

The following references are cited to show the state of the art:

J. S. MAYO, "A Bipolar Repeater for Pulse Code Modulation Signals" THE BELL SYSTEM TECHNICAL JOURNAL, pp. 25-52, Jan. 1962.

BACKGROUND OF THE INVENTION

This invention relates to a data communication system in which data to be transferred is converted or modulated to digital pulse-coded transmission data including two pulse signals having different pulse durations and the digital transmission data is sent through a transmission path from a transmitting end to a receiving end where the received data is demodulated.

In a conventional data communication system, signal transfer over a long distance with high stability must overcome not only voltage drops due to signal attenuation through the transmission path but also the interference between codes due to the frequency dependence of the signal attenuation factor for the transmission path. Generally, such a signal attenuation factor in the transmission path proportionally depends upon the frequency of the signal. For example, in the case where two digital signals having different pulse durations are sent through the transmission path, the attenuation factor of the longer pulse duration signal is smaller than that of the shorter pulse duration signal so that the data reproduced at the receiving side is distorted. This distortion causes a degradation of the S/N ratio and transmission quality.

The article entitled "A Bipolar Repeater for Pulse Code Modulation Signals" by J. S. MAYO in THE BELL SYSTEM TECHNICAL JOURNAL, January 1962, pages 25-51 discloses nonlinear equalization according to which a series circuit of an inductance and a resistor is connected across transmission cable lines in order to reduce the signal distortion which may occur through the transmission cable (especially see page 45 of this Journal).

SUMMARY OF THE INVENTION

One object of this invention is to provide a data communication system in which data transfer can be made while reducing the distortion in the reproduced data, by sending the digital pulse-coded transmission data after the level of transmission signal voltage has been changed in accordance with the pulse dulation of the digital pulse-coded transmission data.

Another object of this invention is to provide a data communication system which can send digital transmission data over a long distance with low loss.

A further object of this invention is to provide a data communication system which has a simple circuit configuration and is therefore inexpensive.

According to one feature of this invention, at the transmitting side the pulse duration of the digital pulse-coded transmission data is detected and the pulse amplitude level of the digital pulse-coded transmission data is changed so that the frequency-attenuation characteristic in the transmission path may be compensated in accordance with the pulse duration.

According to another feature of this invention, the digital pulse-coded transmission data is obtained through the split-phase modulation (SPM) of non-return-to-zero (NRZ) data and applied to a transformer. The pulse duration of the digital pulse-coded transmission data is detected by means of the NRZ data so that the voltage across the primary winding of the transformer is changed in accordance with the detected pulse duration.

According to a further feature of this invention, the digital pulse-coded transmission data is obtained through the phase modulation (PM) of NRZ data and applied to a transformer. The pulse duration of the digital pulse-coded transmission data is detected by means of the phase-modulated output so that the voltage across the primary winding of the transformer is changed in accordance with the detected pulse duration.

BRIEF DESCRIPTION OF THE DESCRIPTIONS

DESCRIPTION OF THE PREFERRED EMBODIMENTS

Figure 1:
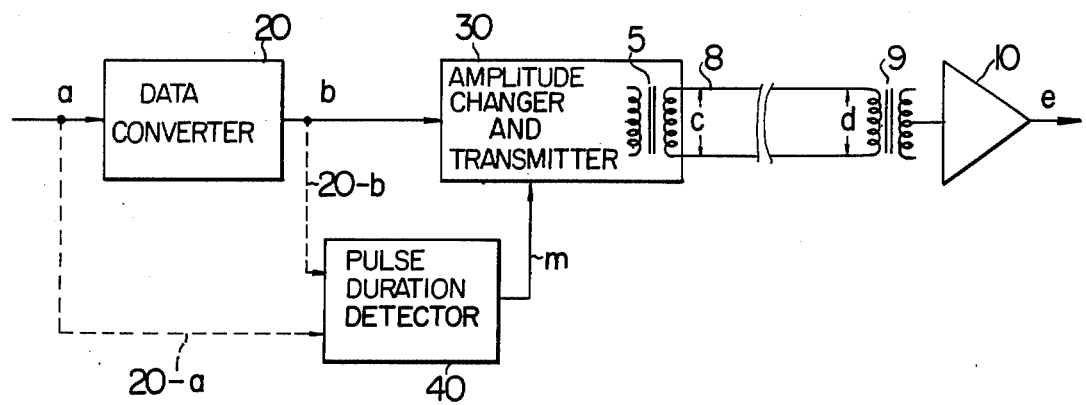
FIG. 1 shows in block diagram form the fundamental constitution of a data communication system according to this invention.

FIG. 1 shows the fundamental constitution of a data communication system according to this invention. In the figure, reference numeral 20 indicates a data converting circuit for converting input data a to be transferred to digital pulse-coded transmission data b including a combination of two pulse signals whose pulse durations are different from each other. The digital pulse-coded transmission data b is applied to an amplitude level changing and transmitter circuit 30 wherein the pulse amplitude level of the digital pulse-coded transmission data b is changed in accordance with the pulse duration in response to an amplitude level changing signal m described later. Then, the amplitude-changed transmission data is supplied through a transmitting transformer 5 to a transmission path 8. A pulse duration detecting circuit 40 takes in the data a from a line 20a or the digital pulse-coded transmission data b from a line 20b and detects the pulse duration of the digital pulse-coded transmission data b to produce the amplitude level changing signal m in accordance with the detected pulse duration. The transmission output c delivered from the transmitting transformer 5 is sent through the transmission path 8 to a receiving side. The received input d is applied through a receiving transformer 9 to an amplifier and waveform-shaper circuit 10 which provides a reproduced output e. The circuit 10 detects the received data d at a constant amplitude level.

Figure 2:
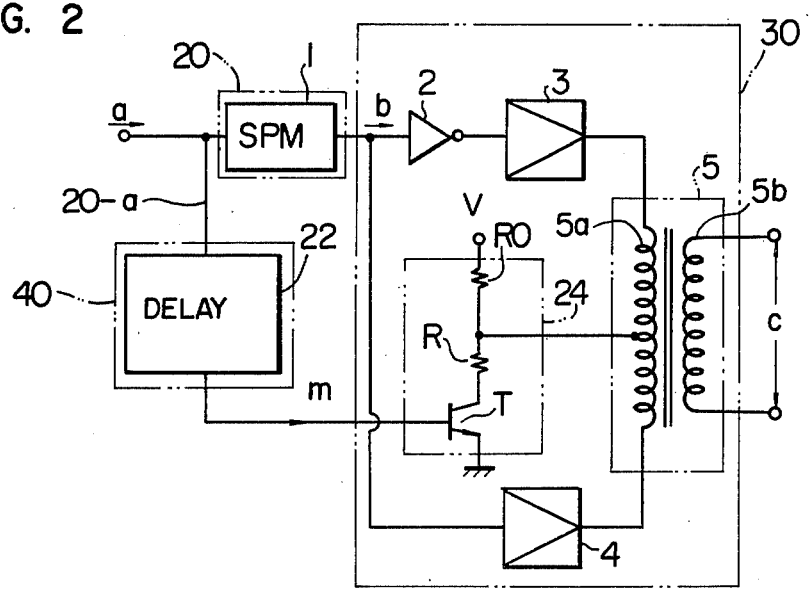
FIG. 2 shows in block diagram form a data communication system according to an embodiment of this invention.
Figure 3:
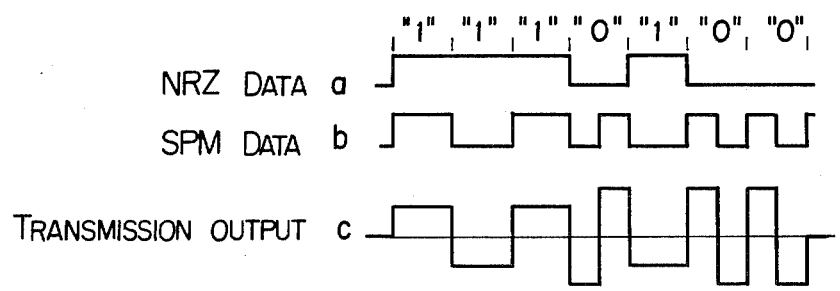
FIG. 3 is a time chart of signal waveforms useful in explaining the operation of the system shown in FIG. 2.

FIG. 2 shows a data transmission system according to an embodiment of this invention, in which a split-phase modulating (SPM) circuit 1 for generating a split-phase modulated (SPM) data b through the split-phase modulation of nonreturn-to-zero (NRZ) data a to be transferred, as shown in FIG. 3, is used as the data converting circuit 20. The split-phase modulated data b has its voltage polarity inverted at every bit transition, as seen from FIG. 3. The voltage polarity is also inverted at the middle of each bit belonging one of "0" and "1" levels ("0" level in the shown example). As a result, the pulse duration of the data corresponding to the bit "1" is twice as large as that of the data corresponding to the bit "0". In the case where the SPM circuit 1 is used as the data converting circuit 20, the function of the pulse duration detecting circuit 40 can be realized by a delay circuit 22. Namely, the amplitude level changing signal m can be obtained by delaying the NRZ transmission data a by a certain constant time. In this case, the delay time in the delay circuit 22 is so selected that the delay times in the operations of the SPM circuit 1 and the amplitude level changing and transmitter circuit 30 (inverter 2 and drivers 3, 4 described later) may be compensated.

The amplitude level changing and transmitter circuit 30 includes an inverter 2 for inverting the voltage polarity of the SPM data b, a transmitting transformer 5, a driver 3 connected with one end of the primary winding 5a of the transformer 5, a driver 4 connected between the SPM circuit 1 and the other end of the primary winding 5a of the transformer 5, and a power source voltage control circuit 24. As to the power source voltage control circuit 24, it consists of an NPN transistor T and resistors R, RO. The amplitude level changing signal m is applied to the base of the transistor T whose emitter is grounded and whose collector is connected through the resistors R and RO with the power source voltage V. The junction point of the resistors R and RO is connected with an intermediate tap of the primary winding 5a of the transformer 5.

In the NRZ transmission data a, the levels "1" and "0" indicate the longer and shorter pulse duration signals in the SPM data b respectively. When the amplitude level changing signal m takes the level "1", that is, when the longer pulse duration signal is transmitted, the transistor T is turned on so that a voltage derived by the division of the power source voltage V by the resistors R and RO is applied to the primary winding 5a of the transformer 5. On the other hand, when the signal m takes the level "0" (that is, when the shorter pulse signal is transmitted), the transistor T is turned off so that the power source voltage V is applied to the primary winding 5a of the transformer 5. Accordingly, the amplitude level of the transmission output c delivered from the transformer 5 is high corresponding to the shorter pulse duration signal and low corresponding to the longer pulse duration signal.

It should be noted that since the purpose of the change in amplitude level is to compensate the attenuation of signal through the transmission path 8 shown in FIG. 1 it is not necessary to make the amplitude level exactly proportional inversely to the pulse duration.

Figure 4:
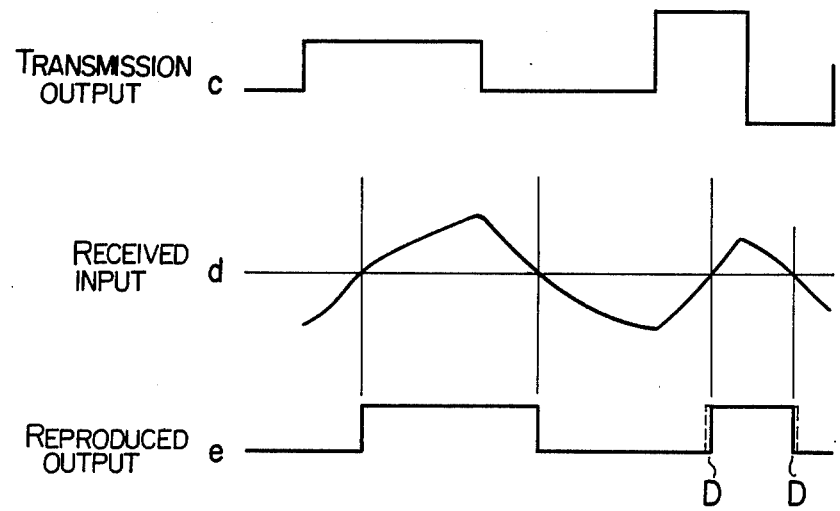
FIG. 4 shows signal waveforms useful for the explanation of the system shown in FIG. 2.

The transmission output c is sent through the transmission ptth 8 to the receiving side. It has been earlier noted that the attenuation factor for the transmission path 8 proportionally depends upon the frequency of the sent signal so that the rate of the attenuation of the amplitude of the shorter pulse duration signal is larger than that of the longer pulse duration signal. However, according to this invention, the amplitude level of the shorter pulse duration signal is made higher than that of the longer pulse duration signal before transmission so that in the case of the reproduction of the pulse duration through the amplification and shaping of the received input d, the distortion D in the reproduced data is lessened in comparison with the case where the amplitude levels of the longer and shorter pulse duration signals are kept equal to each other (see FIG. 4). Accordingly, the S/N ratio and the transmission quality are improved.

In the above-described embodiment, the SPM circuit 1 has been used as the data converting circuit 20. The amplitude level changing signal m could be obtained by merely delaying the NRZ transmission data a, as shown in FIG. 2.

Figure 5:
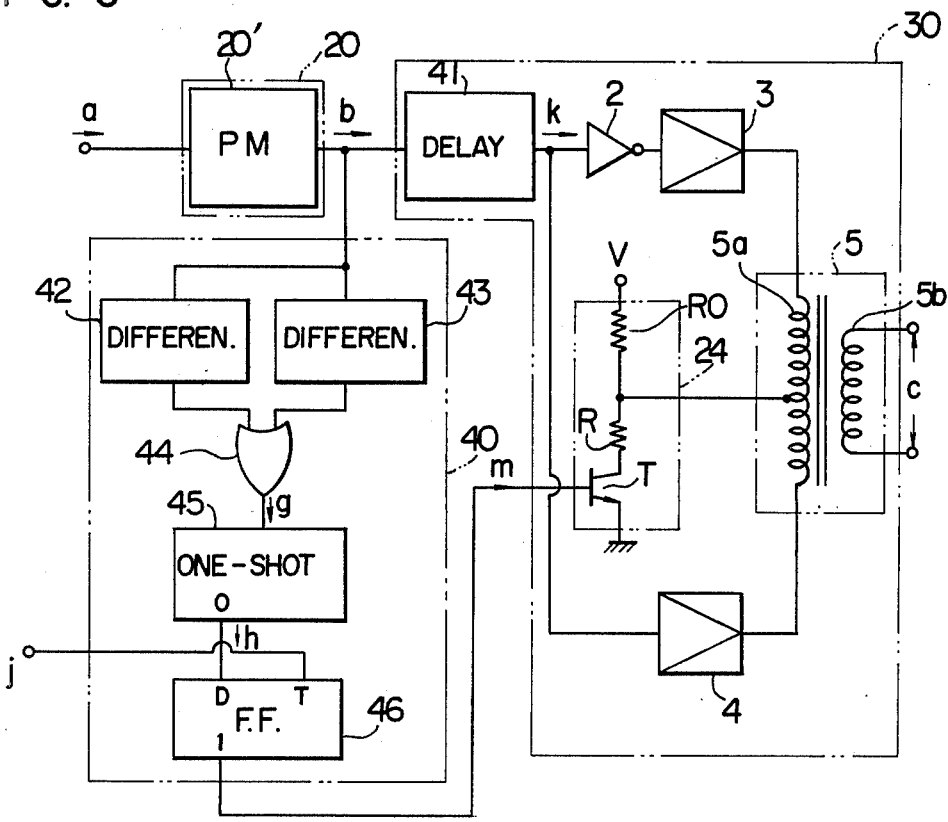
FIG. 5 shows in block diagram form a data communication system as another embodiment of this invention.

A phase modulating (PM) circuit can be used as the data converting circuit 20. In that case, the amplitude level changing signal m can be obtained by means of the digital pulse-coded transmission data b instead of the NRZ data a, as shown by the line 20b in FIG. 1. FIG. 5 shows a concrete example wherein the PM circuit is used and FIG. 6 shows a time chart of signal waveforms useful in explaining the operation of the circuit of FIG. 5.

Figure 6:
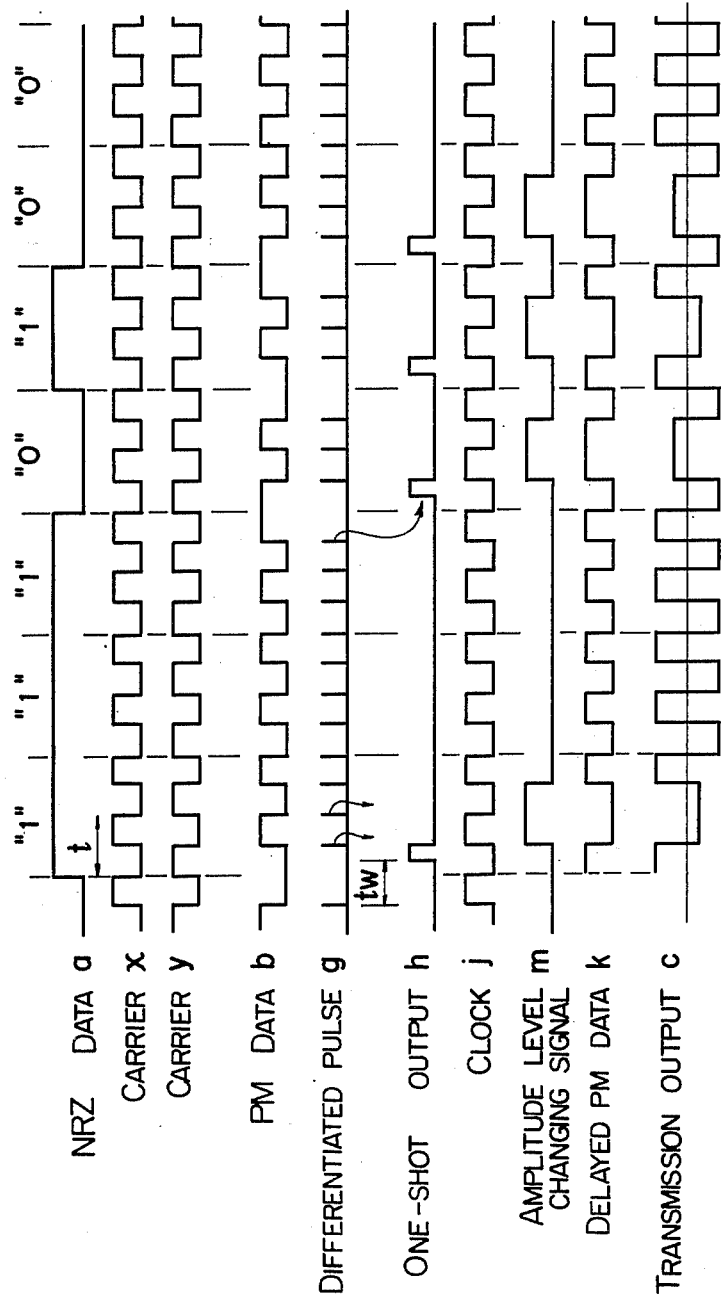
FIG. 6 is a time chart of signal waveforms useful in explaining the operation of the system shown in FIG. 5.

In FIGS. 5 and 6, the NRZ data a is supplied to the PM circuit 20′ which in turn carries out the switching-over between carriers x and y different in phase, in accordance with the levels "1" and "0" of the input signal to produce phase-modulated (PM) data b. The period t of each of the carriers x and y is equal to the bit length of the NRZ data a.

An amplitude level changing signal m can be obtained by supplying the PM data b to the pulse duration detection circuit 40. An example of the pulse duration detecting circuit will be described in detail. The PM data b is supplied to differentiating circuits 42 and 43 which generate rising and falling pulse signals. The rising and falling pulse signals are supplied to an OR gate 44 which in turn produces a differentiated pulse signal g indicative of the change in level of the PM data b. The differentiated pulse signal g is supplied to a retriggerable one-shot multivibrator 45 in which the pulse interval is set to a time $t_w$ equal to about $\frac{3}{4}$ of the period t of the carriers x and y. When the interval between the adjacent differentiated pulses g exceeds $t_w$ (corresponding to the longer pulse duration signal in the PM data b), the one-shot multivibrator 45 delivers its not output h so that the longer pulse duration signal in the PM data b can be detected. A D-T flip-flop 46 receives the output h in timing with a clock signal j synchronized with the carriers x and y to produce an amplitude level changing signal m.

To compensate the delay in the detection operation of the above-described pulse duration detecting circuit 40, the PM data b is delayed through a delay circuit 41 to form delayed PM data k. Just as in FIG. 2, the PM data k is supplied through the inverter 2 to the driver 3 and also supplied directly to the driver 4 to drive the transmitting transformer 5. The amplitude level changing signal m is supplied to the power source voltage circuit 24 to turn the transistor T on and off so that the amplitude level of the transmission output c is changed in accordance with the pulse duration.

Though two embodiments of this invention have been described above, it should be understood that this invention is by no means limited to those embodiments but includes various alterations or modifications without departing from the scope of this invention.

The data communication system according to this invention can decrease the interference between the codes in the digital pulse-coded transmission data and therefore suppress the distortion in the reproduced data. Also, loss of data is low and the utility efficiency of power is high so that it is well adapted for the transfer of digital signal over a long distance. Further, an inexpensive transmission path (for example, paired lines which usually have a large attenuation factor) can be used in this invention. Furthermore, since the change in amplitude level according to this invention does not accompany the increase in the voltage-time product, the transmitting and receiving transformers may have small capacitances. Moreover since the uniform magnetic flux is available, the generation of distortion by the transformers can be suppressed.

I claim:

1. A data communication system comprising:
    data converting means for converting nonreturn-to-zero data signals to digital pulse-coded transmission data signals including a combination of two pulse signals whose pulse durations and different from each other;
    delay means for delaying said nonreturn-to-zero data signals by a prescribed time delay;
    amplitude level changing means for receiving said digital pulse-coded transmission data signals from said data converting means and the output of said delay means and changing the amplitude level of said digital pulse-coded transmission data signals in accordance with the pulse duration of said digital pulse-coded transmission data signals on the basis of the output from said delay means;
    transmitter means for supplying the amplitude level-changed transmission data signals to a transmission path; and
    means for receiving the transmitted data signals and detecting said data at a constant amplitude level.

2. A data communication system as claimed in claim 1, wherein said transmitter means includes a transmitting transformer, and said amplitude level changing means includes a power source voltage control circuit connected with an intermediate tap of the primary winding of said transformer and two drivers connected respectively with opposite ends of the primary winding of said transformer, said digital pulse-coded transmission data from said data converting means being supplied through an inverter to one of said two drivers and directly to the other of said two drivers, said power source voltage control circuit being controlled by the output of said delay means.

3. A data communication system as claimed in claim 2, wherein said power source voltage control circuit has a transistor whose gate is controlled by the output of said delay means and a series circuit of two series-connected resistors which are connected between a power source voltage and the collector of said transistor, the junction point of said two resistors being connected with the intermediate tap of the primary winding of said transformer, the emitter of said transistor being grounded.

4. A data communication system as claimed in claim 1, wherein the delay time defined by said delay means is equal to the delay in the operations of said data converting means and of said inverter and drivers of said amplitude level changing means.

5. A data communication system comprising:
    a circuit for split-phase modulating nonreturn-to-zero data to produce split-phase modulated data;
    an inverter for inverting the voltage polarity of said split-phase modulated data;
    a first driver for receiving an output of said inverter as its input to drive one end of the primary winding of a transmitting transformer;
    a second driver for receiving said split-phase modulated data to drive the other end of the primary winding of said transmitting transformer;
    a power source voltage control circuit connected with an intermediate tap of the primary winding of said transmitting transformer;
    a delay circuit for delaying said nonreturn-to-zero data by a time equal to the delay in the operations of said split-phase modulating circuit and of said inverter and drivers;
    a transmission path connected with the secondary winding of said transmitting transformer;
    a receiving transformer connected with said transmission path; and
    an amplifier and waveform-shaper circuit for amplifying and shaping the output of said receiving transformer,
    whereby said power source voltage control circuit is controlled by the output of said delay circuit to change the voltage level at the primary winding of said transmitting transformer.

* * * * *